Nov. 21, 1933.  R. W. BAILEY  1,936,420

FLANGED CONDUIT

Filed May 2, 1933

Inventor:
Richard W. Bailey,
by Charles E. Tullar
His Attorney.

Patented Nov. 21, 1933

1,936,420

UNITED STATES PATENT OFFICE 1,936,420

FLANGED CONDUIT

Richard W. Bailey, Hale, England, assignor to General Electric Company, a corporation of New York Application May 2, 1933, Serial No. 669,051, and in Great Britain April 30, 1932

6 Claims. (Cl. 285—137)

This invention relates to flanged conduits, pipes or containers for containing fluid at high pressures or temperatures.

Flanged joints of pipes and other containers of fluid at high pressure, and particularly at high temperatures, such as pipes for high pressure steam, require flanges of large proportions compared with the wall thickness of the container. As a consequence, when the container is cold and fluid is admitted the material of the container heats up more rapidly than the flange, and if the latter fits more or less closely upon or is integral with the former, or is capable of exercising constraint thereon, the differential thermal expansion of the two parts results in large stresses being imposed on the wall of the container. Such stresses may be of a magnitude sufficient, either immediately or in the course of time or as a result of repetition, to cause permanent deformation of the container. The deformation thus caused may in some cases impair the connection between parts of the joint, for example between the flange and a pipe on which the flange is screwed.

One object of the present invention is to provide an improved construction and arrangement for flanged conduits whereby stresses in the flanges of such conduits are substantially reduced.

For a consideration of what I believe to be novel and my invention, attention is directed to the following description and the claims appended thereto in connection with the accompanying drawing.

Figure 1:
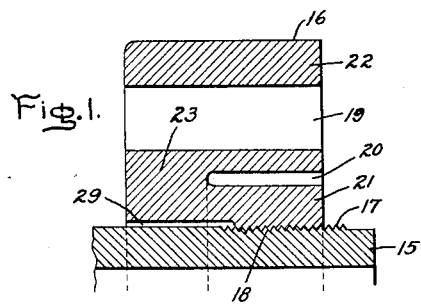
Figures 10, 11, 12:
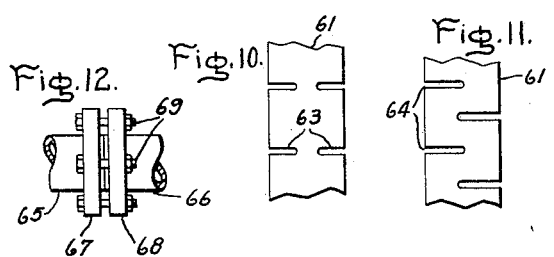

In the drawing, Fig. 1 is a fragmentary, longitudinal, sectional view of the upper part of a single flanged pipe embodying my invention; Figs. 2, 3, 4, 5, 6, 8 and 9 are similar views of modified constructions; Figs. 7 and 10 are fragmentary plan views showing details of construction of the flanges illustrated in Figs. 6 and 9 respectively; Fig. 11 shows a modification of the arrangement shown in Fig. 10; and Fig. 12 shows a view of two abutting conduit sections provided with flanges according to my invention.

According to the present invention the above difficulties are reduced by dividing the flange into two parts or portions united by a connection of reduced area. One of said parts which is closely adjacent to or integral with the container is of relatively small proportions compared with the remaining part forming the main body of the flange. The stress induced in the part of the flange of small proportions and the load transmitted from the main body of the flange to the conduit will be further reduced by reason of flexibility in the connection between the two parts.

In carrying out the invention as applied to a cylindrical conduit flange, for example, the flange, which may be screwed onto or formed integral with the conduit, is divided into two parts by means of an annular groove formed in the flange spaced outside the conduit at a distance to leave a suitable amount of metal of the flange immediately surrounding the pipe. The depth of the groove is such as materially to interrupt the flow of heat from the pipe to the main body of the flange containing the bolt holes, sufficient metal being left at the same time to transmit the stress due to the tension in the bolts to the part of the flange immediately in contact with or integral with the conduit so as to apply pressure at the joint face. Where the flange is screwed on the pipe the groove may extend beyond or overhang the screwed part of the flange so as to increase the flexibility of the connection between the main body of the flange and the part which is intimately connected with the conduit. The screwed part of the flange may project beyond the main body thereof in the direction of the joint and be formed as a spigot to receive a cooperative end of another conduit with which the joint is made. In the case of a flange screwed on a conduit, the flange and conduit may be welded together in order to improve the heat conductivity between them.

The flanged conduit structure shown in Fig. 1 comprises a conduit 15 and a flange 16. The outer surface of the conduit 15 has a screw-threaded portion 17. The inner surface of the flange 16 is similarly provided with a threaded portion 18 which is screwed onto the portion 17 of the conduit. The flange is provided with a pluarilty of holes 19 for bolting the flange to another flange. In accordance with my invention I provide the flange with a recess 20 for interrupting the radial flow of heat from the conduit 15. The recess 20 defines an inner portion 21 and an outer portion 22 of the flange. These two portions in the present instance are integrally united at their left-hand end. The groove or recess 20 must be deep enough to materially interrupt the radial flow of heat from the inner portion 21 to the outer portion 22 and sufficient metal must be supplied to the united rear portions 23 to permit the transmission of the load between the two portions. The groove 20 is concentrically arranged with the conduit and extends in longitudinal direction of the conduit somewhat beyond the screw-threaded portion 18 of the flange in order to increase the flexibility of the structure.

Figure 2:
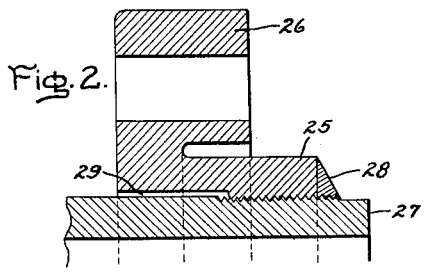

In the arrangement shown in Fig. 2 the screwed portion 25 of the flange projects beyond the main body 26 in the direction of the joint or face 27 of the conduit. The flange is formed as a spigot to receive a cooperating end of another flanged conduit. The end face of the inner portion of the flange in addition is united with the conduit by a weld 28. It will be noted that in the arrangements shown in Figs. 1 and 2 the screwed portions of the flanges extend a distance along the conduit sufficient to enable them to safely bear the stress. Owing to the fact that in joints of this kind for high temperature creep occurs practically only in the part of the flange near the joint face, I screw-thread only a portion of the flange to the conduit. This in addition has the advantage that the part or portion of the flange which is not screw-threaded to the conduit may be formed to define an annular space 29 (Figs. 1 and 2) between the flange and the conduit which has low heat conductivity and thereby increases the resistance to the flow of heat from the conduit to the flange.

Figure 3:
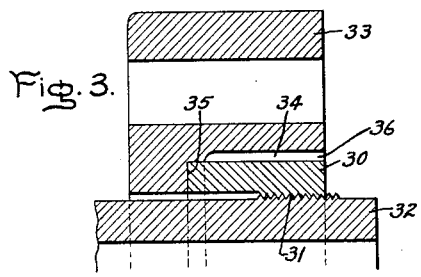

Whereas in the arrangements shown in Figs. 1 and 2 the flange comprises a single solid member, I have shown in Fig. 3 a structure in which the flange is made of two parts. A ring member 30 has an inner screw-threaded portion 31 screwed onto a threaded portion of a conduit 32. The main part 33 of the flange has a cut-away portion 34 forming a shoulder 35 which engages the end face of the ring member 30. The two members define a recess 36 corresponding to recess 20 of Fig. 1.

Figure 4:
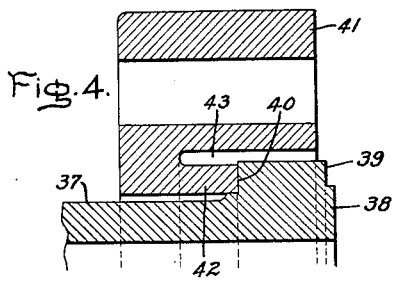

In the arrangement illustrated in Fig. 4 the conduit 37 is formed integrally near its joint face 38 with a collar portion 39 defining a shoulder 40. The flange 41 has an inner portion 42 abutting the shoulder 40 and defining a recess 43 corresponding to recess 20 of Fig. 1 and 36 of Fig. 3. A portion of the outer part is concentrically arranged with the collar 39 and defines therewith an annular space communicating with the groove 43.

Figure 5:
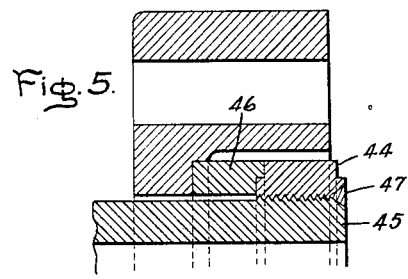

The arrangement shown in Fig. 5 is somewhat similar to the arrangement shown in Fig. 3. In this arrangement, however, the annular member corresponding to the inner ring member 30 of Fig. 3 is formed in two parts, a part or ring 44 which is screw-threaded on the end of a conduit 45 and a separate annular ring or member 46 which is spigoted onto the rear face of the member 44. The annular member 44 in addition is united at its front end face to the conduit by means of a weld 47.

Figure 6:
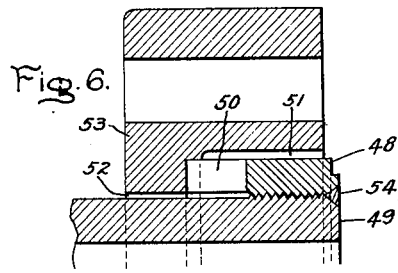
Figure 7:
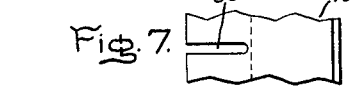

The flange indicated in Figs. 6 and 7 is also similar to the one illustrated in Fig. 3. In this modification, however, a ring member 48 is provided having a front portion screw-threaded to a conduit 49 and a rear portion having a plurality of slots 50 as shown in Fig. 7. These slots provide for communication between a groove 51 corresponding to groove 20 in Fig. 1 and an annular space 52 defined between the flange and the conduit corresponding to space 29 of Fig. 1. The slot also provides additional surface for radiation of the heat during its passage from the conduit to the rear portion 53 of the flange. The slots furthermore increase the flexibility of the structure. The front face of the annular member 48 is welded at 54 to the joint face of the conduit.

Figure 8:
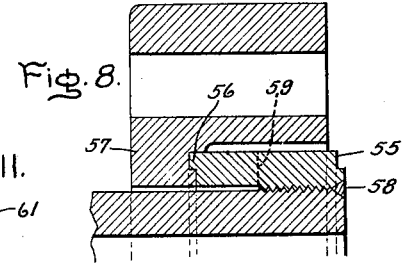

Fig. 8 shows another modification of the structure shown in Fig. 3 in which the ring member 55 is formed at its rear face with a spigot 56 projecting into a groove cut in the rear portion 57 of the main flange portion. The front face of the conduit ring member 55 is welded at 58 to the conduit and the rear portion of member 55 has slots 59 corresponding to slots 50 of Figs. 6 and 7.

Figure 9:
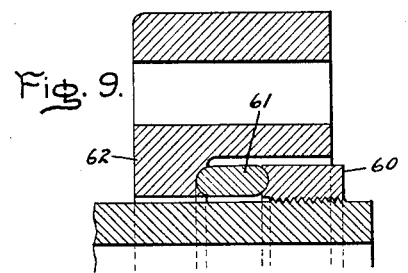

Fig. 9 shows an arrangement similar to that illustrated in Fig. 5 comprising a ring member 60 corresponding to member 44 in Fig. 5 and another ring member 61 interposed between the rear flange portion 62 and the ring member 60. The ring member 61, which may be termed an intermediate member, has rounded edges engaging corresponding grooves cut into one face of the screw-threaded member 60 and the rear flange portion 62. The intermediate member 61 increases the flexibility of the flange and this flexibility may be further increased by cutting grooves 63 or 64 into member 61 as indicated in the two modifications, Figs. 10 and 11 respectively.

Fig. 12 shows two conduit sections 65 and 66 provided with flanges 67 and 68 according to my invention. The flanges are held together by means of bolts 69.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. In a flanged conduit structure, the combination of a conduit and a flange having a threaded portion screwed onto a threaded end portion of the conduit, the flange having a deep groove concentrically arranged with the conduit defining a small inner portion and a large outer portion provided with holes for receiving bolts, said groove decreasing the heat transfer from the inner to the outer flanged portion, one end of the groove extending axially beyond the screw-threaded portion of the flange to increase the flexibility thereof.

2. In a flanged conduit structure, the combination of a conduit and a flange having an inner and an outer portion, the inner portion being fastened to the conduit and abutting a shoulder formed by the outer portion, the two portions defining a groove for decreasing the heat transfer from the inner portion to the outer portion, the latter having holes for receiving bolts.

3. In a flanged conduit structure, the combination of a conduit and a flange comprising an inner portion and an outer portion, the inner portion including a ring member fastened to the conduit and an intermediate member having one end engaging an end of the ring member and another end engaging a shoulder defined by the outer member, the inner and outer portions defining a recess for decreasing the heat transfer from the conduit to the outer portion.

4. In a flanged conduit structure, the combination of a conduit and a flange comprising an inner portion and an outer portion, the inner portion including a ring member fastened to the conduit and an intermediate member having one end engaging an end of the ring member and another end engaging a shoulder defined by the outer member, the inner and outer portions defining a recess for decreasing the heat transfer from the conduit to the outer portion, the intermediate member having rounded edges and the above named end of the ring member and the shoulder of the outer member being formed to fit the rounded edges to increase the flexibility of the structure.

5. In a flanged conduit structure, the combination of a conduit and a flange comprising an inner portion and an outer portion, the inner portion having a ring member fastened to the conduit and an intermediate member having one end engaging an end of the ring member and another end engaging a shoulder defined by the outer member, the inner and outer portions defining a recess for decreasing the heat transfer from the conduit to the outer portion, the intermediate member having rounded edges and the above named end of the ring member and the shoulder of the outer member being formed to fit the rounded edges to increase the flexibility of the flange, the intermediate member having a plurality of longitudinal slots to further increase the flexibility of the structure.

6. In a flanged conduit structure, the combination of a conduit and a flange, the flange having a deep annular groove concentrically arranged with the conduit and defining a small inner and a large solid outer flange portion, the inner flange portion having a front part fastened to the conduit and a rear part spaced from the conduit to define an annular space.

RICHARD W. BAILEY.